United States Patent
Jochum et al.

(10) Patent No.: US 7,064,528 B2
(45) Date of Patent: Jun. 20, 2006

(54) DROOP AMPLIFIER CIRCUIT

(75) Inventors: Thomas A. Jochum, Durham, NC (US); John S. Kleine, Cary, NC (US)

(73) Assignee: Intersil Americas, Inc., Milpitas, CA (US)

( * ) Notice: Subject to any disclaimer, the term of this patent is extended or adjusted under 35 U.S.C. 154(b) by 59 days.

(21) Appl. No.: 10/854,357

(22) Filed: May 26, 2004

(65) Prior Publication Data

US 2005/0200340 A1    Sep. 15, 2005

Related U.S. Application Data

(60) Provisional application No. 60/552,659, filed on Mar. 11, 2004.

(51) Int. Cl.
    *G05F 1/44* (2006.01)
(52) U.S. Cl. .............. 323/266; 323/285; 323/222; 327/345
(58) Field of Classification Search ............ 323/222, 323/224, 282–286, 272; 363/44, 79; 327/64, 327/327
    See application file for complete search history.

(56) References Cited

U.S. PATENT DOCUMENTS

2003/0102849 A1    6/2003    Schiff et al.

OTHER PUBLICATIONS

Xin Zhang et al: "A Novel VRM control with direct load current feedback" Applied Power Electronics Conference and Exposition, 2004. APEC 04. Nineteenth Annual IEEE Anaheim, CA, USA Feb. 22-26, 2004 Piscataway, NJ, USA, IEEE, , vol. 1, Feb. 22, 2004 pp. 267-271, XP010704440 ISBN: 0-7803-8269-2 the whole document.

Kaiwei Yao et al: "Optimal desing of the active droop control method for the transient response" APEC 2003 18th Annual IEEE Applied Power Electronics Conference and Exposition. Miami Beach, FL, Feb. 9-13, 2003, Annual Applied Power Electronics Conference, New York, NY: IEEE, US, vol. 1 of 2. conf. 18, Feb. 9, 2003, pp. 718-723, XP010631589 ISBN: 0-7803-7768-0 the whole document.

Redl R et al: "Optimizing eh load transient response of the buck converter" Applied Power Elctronics Conference and Exposition, 1998, APEC '98, Conference Proceedings 1998. Thirteenth Annual Anaheim, CA, USA Feb. 15-19, 1998, New York, NY USA, IEEE, US, vol. 1, Feb. 15, 1998; pp. 170-176, XP010263591 ISBN: 0-7803-4340-9 the whole document.

International Search Report. 5 sheets.

*Primary Examiner*—Rajnikant B. Patel
(74) *Attorney, Agent, or Firm*—Gary R. Stanford

(57) ABSTRACT

A droop amplifier circuit for a DC-DC regulator including an amplifier, at least one first resistive device, a second resistive device, a third resistive device, and a first capacitive device. Each first resistive device is coupled between an output inductor (phase node or current sense node) and the amplifier's non-inverting input. The first capacitive device is coupled between the regulator output and the amplifier's output. The second resistive device is coupled between the regulator output and the amplifier's inverting input. The third resistive device is coupled between the amplifier's inverting input and output. A second capacitive device may be coupled between the regulator output and the amplifier's non-inverting input. A fourth resistive device may be coupled in parallel with the second capacitive device. A relatively small, simple and low performing amplifier is sufficient. Circuit area and power are reduced, and low input offset voltage is more easily achieved.

20 Claims, 4 Drawing Sheets

DROOP AMPLIFIER CIRCUIT

CROSS-REFERENCE TO RELATED APPLICATIONS

This application claims the benefit of U.S. Provisional Application No. 60/552,659 filed on Mar. 11, 2004, which is incorporated by reference herein for all intents and purposes.

BACKGROUND OF THE INVENTION

1. Field of the Invention

The present invention relates to droop amplifiers, and more particularly to a droop amplifier circuit that allows the use a relatively low performance, simple amplifier device.

2. Description of the Related Art

In some styles of DC/DC regulators, the output voltage is desired to fall (or "droop") proportional to the load current. A droop circuit is typically provided and configured to sense an output parameter related to the load current and control the amount of droop by providing a corresponding droop voltage. The amount of droop may be specified by the manufacturer of the load receiving power from the DC-DC regulator. The manufacturers of microprocessor typically specify source voltage level for various load levels between low or no load and full load conditions. For example, the source voltage is specified to decrease to a pre-specified voltage level when the microprocessor reaches a predetermined high load level (and usually to droop by a proportional amount in between).

A conventional droop amplifier circuit included an operational amplifier or the like which had several disadvantages. The amplifier was required to be a high speed device capable of producing high speed current output (di/dt) and fast output voltage responses (dv/dt). Each phase node of a multiphase DC-DC converter has large and fast voltage transitions which are reflected through the corresponding resistors to the inverting input of the droop amplifier. In response to every such transition of each phase node, the output of the droop amplifier had to deliver a large amount of current through a feedback capacitor very quickly to maintain feedback. Thus, the amplifier had to be capable of delivering a very high di/dt at its output. The output voltage also exhibits fast voltage transitions in response to load conditions. For example, the output voltage drops almost instantaneously in response to a large and sudden increase in the load current level. The output of the conventional droop amplifier had to respond as quickly as possible to such output voltage transitions. Thus, the output of the amplifier had to create fast voltage transitions (dv/dt) to maintain the droop voltage.

It is desired to provide a droop amplifier circuit that significantly relaxes the droop amplifier requirements.

SUMMARY OF THE INVENTION

A droop amplifier circuit according to an embodiment of the present invention is provided for a DC-DC regulator, where the droop amplifier circuit includes an amplifier, at least one first resistive device, a second resistive device, a third resistive device, and a first capacitive device. The DC-DC regulator includes at least one output inductor coupled between a corresponding phase node and an output. Each first resistive device is for coupling between a corresponding output inductor and a non-inverting input of the amplifier. The first capacitive device is for coupling between the DC-DC regulator output and an output of the amplifier. The second resistive device is for coupling between the DC-DC regulator output and an inverting input of the amplifier. The third resistive device is coupled between the inverting input and the output of the amplifier.

The exemplary droop amplifier circuit allows relaxed requirements of the amplifier. The amplifier may be a low power amplifier. It may exhibit relatively low di/dt and dv/dt responses at its output. It may be a transconductance amplifier having a high output impedance at high frequencies. In general, a relatively small, simple and low performing amplifier is sufficient to achieve the desired results. Circuit area and power are thus reduced. Low input offset voltage for the amplifier is more easily achieved as compared to the amplifier required for a conventional droop amplifier circuit.

In one embodiment, each of the first resistive devices is for coupling to a corresponding phase node of the DC-DC converter. In this case, a second capacitive device is provided for coupling between the DC-DC regulator output and the non-inverting input of the amplifier. A fourth resistive device may be coupled in parallel with the second capacitive device.

In another embodiment, the DC-DC regulator includes a current sense resistor coupled between each output inductor and the DC-DC regulator output. In this case, each first resistive device is for coupling to a corresponding current sense node. Also, a fourth resistive device may be provided for coupling between the DC-DC regulator output and the non-inverting input of the amplifier.

A multiphase DC-DC converter according to an embodiment of the present invention includes multiple switching circuits, control logic, and a droop circuit. Each switching circuit switches an input voltage through a corresponding output inductor via a corresponding phase node based on a corresponding PWM signal to develop an output voltage at an output node. The control logic monitors the output voltage and a droop voltage for developing the PWM signals. The droop circuit includes an amplifier for developing the droop voltage relative to the output node, multiple first resistors, second and third resistors and a first capacitor. Each first resistor is coupled between a corresponding output inductor and the non-inverting input of the amplifier. The first capacitor is coupled between the output node and the output of the amplifier. The second resistor is coupled between the output node and the inverting input of the amplifier. The third resistor is coupled between the inverting input and the output of the amplifier.

In one embodiment, each of the first resistors may be coupled to a corresponding phase node. In this case, a second capacitor is coupled between the output node and the non-inverting input of the amplifier. A fourth resistor may be included and coupled in parallel with the second capacitor.

In an alternative embodiment, the multiphase DC-DC converter includes multiple current sense resistors, each coupled between a corresponding output inductor and the output node. In this case, each first resistor may be coupled to a corresponding current sense node rather than to a phase node. Again, a fourth resistor may be provided and coupled between the output node and the non-inverting input of the amplifier.

A load having an output voltage droop requirement may be coupled to the output node. In a specific configuration, the load is a microprocessor.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
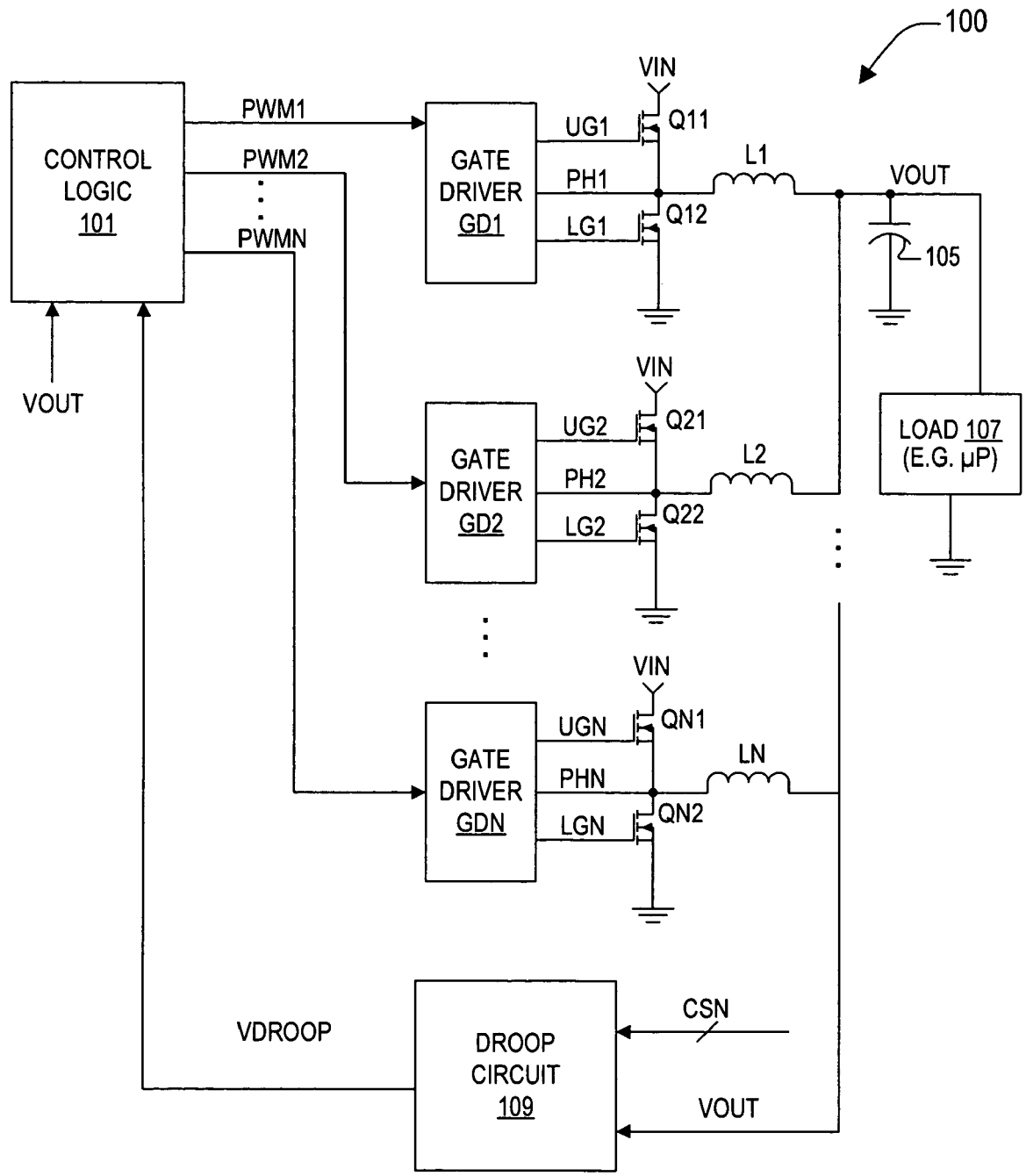
FIG. 1 is a simplified schematic and block diagram of a multiphase buck-mode pulse width modulation (PWM) DC-DC regulator 100 implemented according to an embodiment of the present invention.

FIG. 1 is a simplified schematic and block diagram of a multiphase buck-mode pulse width modulation (PWM) DC-DC regulator 100 implemented according to an embodiment of the present invention. The regulator 100 includes a PWM controller or control logic 101 which provides a number "N" of PWM signals PWM1, PWM2, . . . , PWMN to respective N gate drivers GD1, GD2, . . . , GDN forming N channels for the regulator 100. The number N is any positive integer greater than one. For the first channel, the PWM1 signal is provided to the first gate driver GD1, which controls the turn-on and turn-off of a pair of electronic power switching devices or switches Q11 and Q12. In particular, the gate driver GD1 generates an upper gate switching signal UG1 provided to the control terminal (e.g., gate) of the upper (or high side) switch Q11 and generates a lower gate switching signal LG1 provided to the control terminal of the lower (or low side) switch Q12.

In the particular configuration shown, the switches Q11 and Q12 are depicted as N-channel metal-oxide semiconductor field-effect transistors (MOSFETs) having their drain-source current paths coupled in series between a pair of power supply rails (e.g., VIN and ground (GND)). Other types of electronic switching devices are contemplated. The drain of switch Q11 is coupled to VIN and its source is coupled to the source of switch Q12 at a phase node PH1. The source of Q12 is coupled to GND. The phase node PH1 is coupled to one end of an output inductor L1, having its other end coupled to a common output node VOUT developing the output signal VOUT. A node and the signal it develops are referred to herein with the same name unless otherwise indicated.

The remaining channels 2–N of the regulator 100 are configured in substantially the same manner as the first channel. The PWM2 (or PWMN) signal is provided to the gate driver GD2 (or GDN), which provides signals UG2 and LG2 (or UGN and LGN) to drive switches Q21 and Q22 (or QN1 and QN2) coupled together at phase node PH2 (or PHN). The phase node PH2 (or PHN) is coupled through output inductor L2 (or LN) to VOUT. The VOUT node is coupled to a load reservoir capacitor 105 and to a load 107 both referenced to a power supply rail (e.g., GND). The load 107 is any type of circuitry or logic, such as a microprocessor (μP) or the like. The VOUT signal is fed back to the control circuit 101 and to a droop circuit 109. The droop circuit 109 develops a droop voltage VDROOP, which is fed back to the control logic 101. The multiple phases or channels of the regulator 100 are coupled in parallel to develop the VOUT signal. The switches of each channel are alternatively activated to develop VOUT, and each phase node PH1–PHN exhibits large and fast transitions. For the multiphase regulator 100, each channel includes a separate phase node and output inductor.

In some styles of DC/DC regulators, including the DC/DC regulator 100, the output voltage VOUT is desired to fall (or "droop") proportional to the load current. The droop circuit 109 is configured to sense an output parameter related to the load current and control the amount of droop of VOUT. In this case, the droop circuit 100 is coupled to a current sense (CS) node of each channel, shown collectively as the CSN signals, and develops VDROOP to control the amount of "droop" or decrease of the output voltage VOUT in response to load conditions. In some embodiments, as further described below, the CSN signals are the PH1–PHN signals, although other sensing locations are contemplated depending upon the particular configuration. The amount of droop may be specified by the manufacturer of one or more load components receiving power from the regulator 100. For example, the regulator 100 generates the VOUT signal at a specified voltage level, such as 1 Volt (V), to provide source voltage to a microprocessor under no-load or low-load conditions, such as drawing 10 Amperes (A) or less. The VOUT signal is specified by the manufacturer of the microprocessor to decrease to a pre-specified voltage level when the microprocessor reaches a predetermined high load level (and usually to droop by a proportional amount in between). As an example, it may be specified that VOUT drop to 0.9V when the microprocessor draws a high load current level of 50 A. The droop circuit 109 is intended to control the specified amount of droop under the various load conditions.

Figure 2:
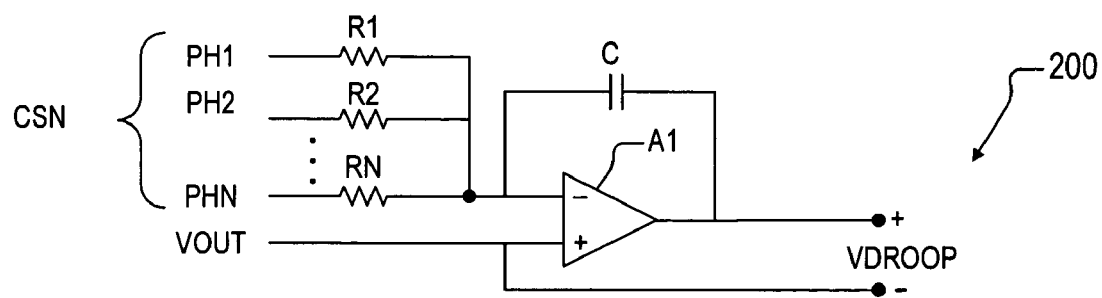
FIG. 2 is a schematic diagram of a conventional droop amplifier circuit implemented according to prior art.

FIG. 2 is a schematic diagram of a conventional droop amplifier circuit 200 implemented according to prior art. The illustrated conventional droop amplifier circuit 200 is implemented for the N-channel case with N phase nodes PH1–PHN and would otherwise be used as the droop circuit 109 to implement a conventional droop method. The phase nodes PH1–PHN are coupled through corresponding resistors R1, R2, . . . , RN, respectively, to the inverting input of an amplifier A1. The amplifier A1 is typically an operational amplifier or the like. A feedback capacitor C is coupled between the inverting input and the output of the amplifier A1 and VOUT is coupled to the non-inverting input of the amplifier A1. In this simplified example, the output of the amplifier A1 provides the positive polarity (+) of the VDROOP signal and VOUT provides the negative polarity (−) of VDROOP.

The conventional droop amplifier circuit 200 has several disadvantages, particularly associated with the amplifier A1. The amplifier A1 is required to be a high speed device capable of producing high speed current output (di/dt) and fast output voltage responses (dv/dt). Each of the phase nodes PH1–PHN have large and fast voltage transitions which are reflected through the corresponding resistors R1–RN to the inverting input of the amplifier A1. In response to every such transition of the phase nodes, the output of the amplifier A1 must deliver a large amount of current through the feedback capacitor C very quickly to maintain feedback. Thus, the amplifier A1 must be capable of delivering a very high di/dt at the output. VOUT also exhibits fast voltage transitions in response to load conditions. For example, VOUT drops almost instantaneously in response to a large and sudden increase in power consumption of the load, such as from 1V to 0.9V for a concomitant immediate step in load current level. The output of the amplifier A1 must respond as quickly as possible to VOUT transitions. Thus, the output of the amplifier A1 must create fast voltage transitions (dv/dt) to maintain feedback, such as to maintain VDROOP at approximately the same level.

Figure 3:
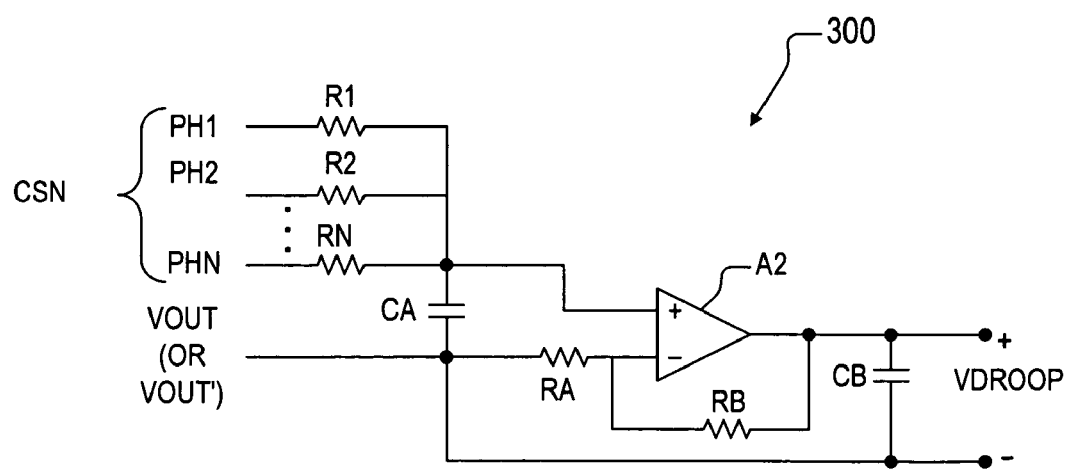
FIG. 3 is a schematic diagram of a droop amplifier circuit implemented according to an exemplary embodiment of the present invention, which may be used as the droop circuit of FIG. 1.

FIG. 3 is a schematic diagram of a droop amplifier circuit 300 implemented according to an exemplary embodiment of the present invention. In one exemplary embodiment, the droop amplifier circuit 300 is used as the droop circuit 109. In this case, the phase nodes PH1–PHN are coupled through the corresponding resistors R1, R2, ..., RN, respectively, to the non-inverting input of an amplifier A2. The amplifier A2 is typically a transconductance amplifier or the like with a high output impedance at high frequency. VOUT is coupled to the inverting input of the amplifier A2 through a resistor RA. Alternatively, a node VOUT' is used for coupling to the output node, further described below. A capacitor CA is coupled between the non-inverting input of the amplifier A2 and VOUT. A feedback resistor RB is coupled between the inverting input and the output of the amplifier A2. A capacitor CB is coupled between VOUT and the output of the amplifier A2. The output of the amplifier A2 provides the positive polarity (+) of the VDROOP signal and VOUT provides the negative polarity (−) of VDROOP.

The large and fast transitions of the phase nodes PH1–PHN are slowed by the combination of the input resistors R1–RN and the capacitor CA at the non-inverting input of the amplifier A2. Thus, the amplifier A2 does not have to respond with fast current transitions so that the di/dt requirement is substantially reduced. The amplifier A2 has a high output impedance at high frequency. The capacitor CB couples the fast edges of VOUT to the output of the amplifier A2, so that the amplifier A2 does not have to create fast voltage transitions at its output. Thus, the dv/dt requirement at the output of the amplifier A2 is substantially reduced. In this manner, the droop amplifier circuit 300 does not require a fast amplifier, so that a relatively small, simple and low performing amplifier is sufficient to achieve the desired results. Circuit area and power are thus reduced. Low input offset voltage for the amplifier A2 is more easily achieved as compared to the amplifier A1 of the conventional droop amplifier circuit 100.

Figure 4:
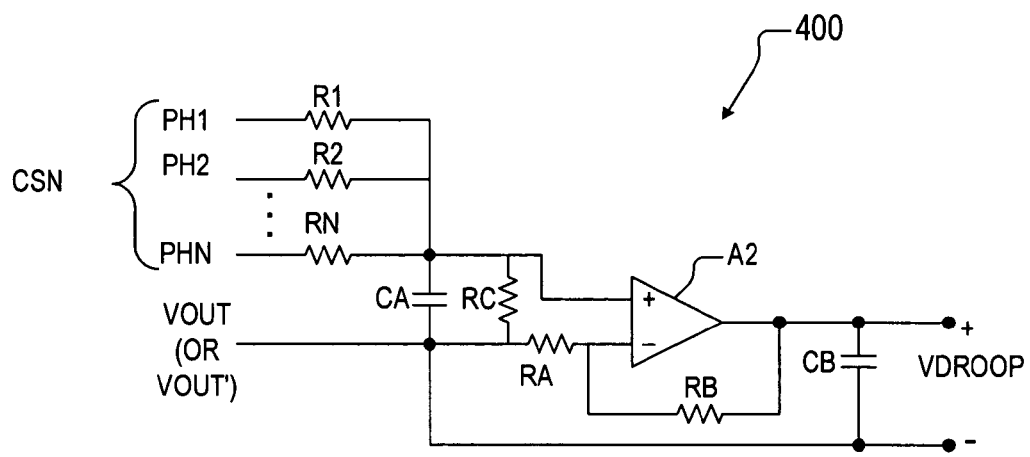
FIG. 4 is a schematic diagram of a droop amplifier circuit implemented according to another exemplary embodiment of the present invention, which may also be used as the droop circuit of FIG. 1.

FIG. 4 is a schematic diagram of a droop amplifier circuit 400 implemented according to another exemplary embodiment of the present invention, which may also be used as the droop circuit 109. The droop amplifier circuit 400 is substantially similar to the droop amplifier circuit 300 in which similar components assume the same reference numbers, with an additional resistor RC coupled between VOUT (or VOUT') and the non-inverting input of the amplifier A2.

Figure 5:
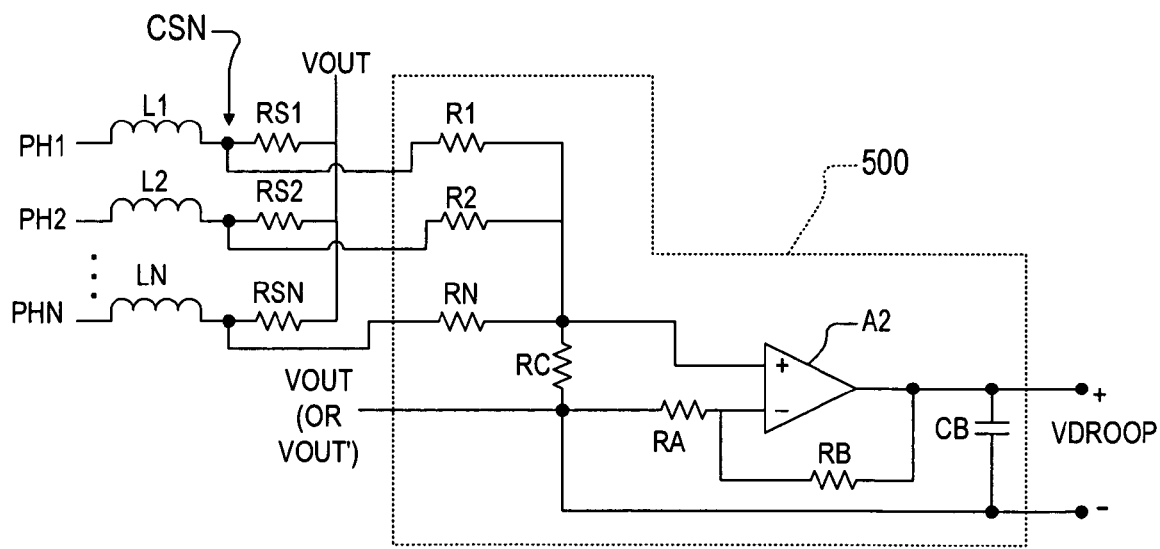
FIG. 5 is a schematic diagram of a droop amplifier circuit implemented according to another exemplary embodiment of the present invention, which may also be used as the droop circuit of FIG. 1.

FIG. 5 is a schematic diagram of a droop amplifier circuit 500 implemented according to another exemplary embodiment of the present invention, which may also be used as the droop circuit 109. The droop amplifier circuit 500 is substantially similar to the droop amplifier circuit 400 in which similar components assume the same reference numbers, and where the capacitor CA is removed. In this case, the regulator 100 includes additional sense resistors RS1–RSN coupled between the respective output inductors L1–LN and VOUT as shown. The sense resistors RS1–RSN are very small valued resistors, such as on the order of 10 milliohms (mΩ) or the like. The resistors R1–RN are coupled to the junctions between the output inductors L1–LN and the corresponding sense resistors RS1–RSN, where the junctions form the CSN nodes or signals. The resistors R1–RN are relatively high valued resistors, such as on the order of 10 kilohms (kΩ) or the like. The droop amplifier circuit 500 is suitable for some manufacturers in which the sense resistors RS1–RSN are included for sensing the load current through the inductors L1–LN. This enables the resistors R1–RN to be coupled to the intermediate junctions between the output inductors and the sense resistors. Since the transitions of the VOUT (or VOUT') signal are significantly smaller than the phase node transitions, the capacitor CA may be omitted. Yet the capacitor CB is still provided at the output of the amplifier A2.

Figure 6:
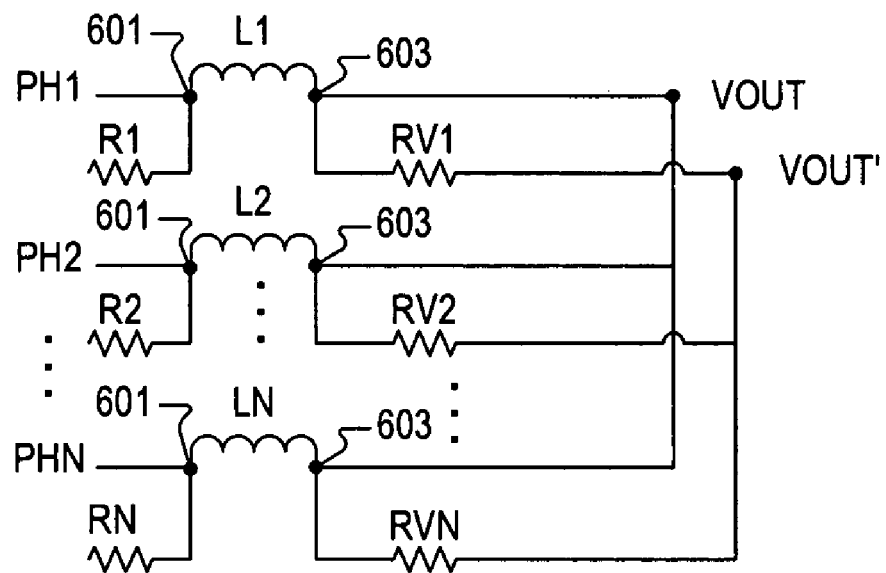
FIG. 6 is a schematic diagram illustrating an alternative embodiment for resistively coupling the droop amplifiers of FIGS. 3 and 4 to the output node.

FIG. 6 is a schematic diagram illustrating an alternative embodiment for resistively coupling the droop amplifiers of 300 and 400 to the output node, forming the alternative VOUT' node. The output inductors L1–LN are each shown coupled between corresponding nodes 601 and 603, each pair representing the physical location or point where the respective output inductor is soldered to the underlying printed circuit board (PCB). Each node 601 is coupled to a respective one of the phase nodes PH1–PHN and the nodes 603 are collectively coupled to VOUT. As previously described, the phase nodes PH1–PHN are coupled through respective resistors R1–RN to the non-inverting input of the amplifier A2. As shown, the resistors R1–RN are each coupled to a corresponding one of the nodes 601 for coupling to the corresponding output inductor. Since the current flowing between each phase node and its corresponding output inductor is relative high, such as on the order of several tens of Amperes, connection of the resistors R1–RN to the specific location at which the corresponding output inductors are soldered to the PCB reduces error. The resistors R1–RN are relatively high valued resistors, such as on the order of 10 kΩ or the like as previously described.

Another set of resistors RV1–RVN each have one end coupled to a corresponding node 603 of a corresponding one of the output inductors L1–LN and another end coupled to form the VOUT' node. In this alternative embodiment, the VOUT' node is coupled instead to the junction between the capacitor CA and the resistor RA and forms the negative voltage reference of VDROOP rather than VOUT. The resistors RV1–RVN reduce or otherwise eliminate any errors of VDROOP that are developed by PCB trace resistance between the output inductors L1–LN and the load 107. The resistors RV1–RVN are relatively small valued resistors, such as on the order of 10 Ω or the like, as compared to the larger resistors R1–RN.

Figure 7:
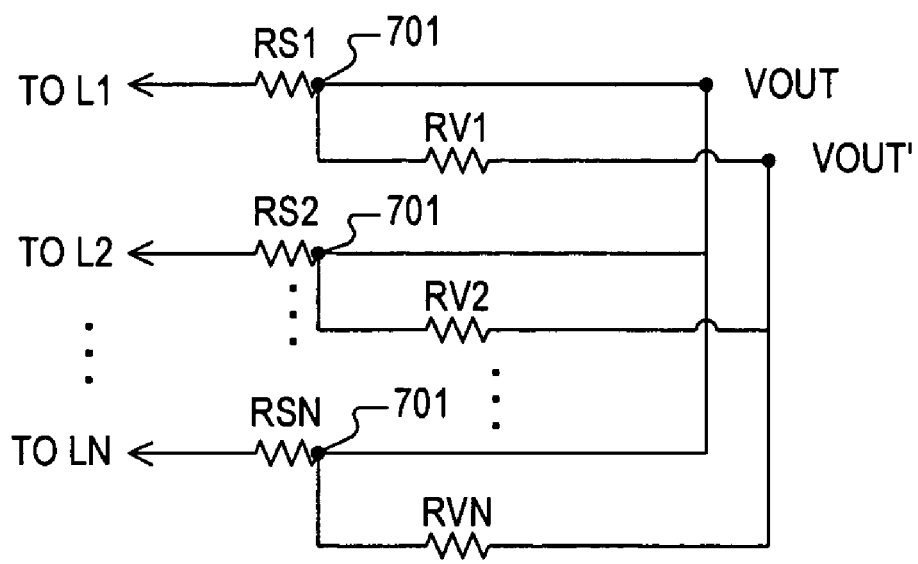
FIG. 7 is a schematic diagram illustrating an alternative embodiment for resistively coupling the droop amplifier of FIG. 5 to the output node.

FIG. 7 is a schematic diagram illustrating an alternative embodiment for resistively coupling the droop amplifier 500 to the output node, forming the alternative VOUT' node. In this case, the sense resistors RS1–RSN are each coupled to a corresponding one of multiple nodes 701, each representing the physical location or point where the respective sense resistor is soldered to the underlying PCB. Each of the resistors RV1–RVN has one end coupled to a corresponding one of the sense resistors RS1–RSN at a respective one of the nodes 701, and another end forming the alternative VOUT' node. The VOUT' node is coupled instead to the resistor RA and forms the negative voltage reference of VDROOP rather than VOUT. The resistors RV1–RVN reduce or otherwise eliminate any errors of VDROOP that are developed by PCB trace resistance between the sense resistors and the load 107. Again, the resistors RV1–RVN are relatively small valued resistors, such as on the order of 10 Ω or the like, although the sense resistors RS1–RSN are even smaller, such as on the order of 10 mΩ or like as previously described.

Although the present invention has been described in considerable detail with reference to certain preferred versions thereof, other versions and variations are possible and contemplated. For example, although the present invention is illustrated for a multiphase DC-DC regulator, it may also be applied to other types of regulators including single phase DC-DC regulators. Those skilled in the art should appreciate that they can readily use the disclosed conception and specific embodiments as a basis for designing or modifying other structures for providing out the same purposes of the present invention without departing from the spirit and scope of the invention as defined by the appended claims.

What is claimed is:

1. A droop amplifier circuit for a DC-DC regulator with at least one output inductor coupled between a corresponding one of at least one phase node and an output, comprising:
   an amplifier having an inverting input, a non-inverting input and an output;
   at least one first resistive device, each for coupling between a corresponding output inductor and said non-inverting input of said amplifier;
   a first capacitive device for coupling between the DC-DC regulator output and said output of said amplifier;
   a second resistive device for coupling between the DC-DC regulator output and said inverting input of said amplifier; and
   a third resistive device coupled between said inverting input and said output of said amplifier.

2. The droop amplifier circuit of claim 1, wherein each of said at least one first resistive device is for coupling to a corresponding phase node of the DC-DC converter, further comprising a second capacitive device for coupling between the DC-DC regulator output and said non-inverting input of said amplifier.

3. The droop amplifier circuit of claim 2, further comprising a fourth resistive device coupled in parallel with said second capacitive device.

4. The droop amplifier circuit of claim 2, further comprising at least one fourth resistive device, each having a first end for coupling to an output terminal of a corresponding one of the at least one output inductor, and a second end forming an alternative output node coupled to said first and second capacitive devices and said second resistive device instead of the DC-DC regulator output.

5. The droop amplifier circuit of claim 1, the DC-DC regulator including at least one current sense resistor coupled between a corresponding output inductor and the DC-DC regulator output, wherein each of said at least one first resistive device is for coupling to a corresponding current sense node.

6. The droop amplifier circuit of claim 5, further comprising a fourth resistive device for coupling between said DC-DC regulator output and said non-inverting input of said amplifier.

7. The droop amplifier circuit of claim 5, further comprising at least one fourth resistive device, each having a first end for coupling to an output terminal of a corresponding one of the at least one current sense resistor, and a second end forming an alternative output node coupled to said first capacitive device and said second resistive device instead of the DC-DC regulator output.

8. The droop amplifier circuit of claim 1, wherein said amplifier comprises a low power amplifier.

9. The droop amplifier circuit of claim 1, wherein said amplifier exhibits relatively low di/dt and dv/dt responses.

10. The droop amplifier circuit of claim 1, wherein said amplifier comprises a transconductance amplifier with a high output impedance at high frequencies.

11. A multiphase DC-DC converter, comprising:
    a plurality of switching circuits, each for switching an input voltage through a corresponding one of a plurality of output inductors via a corresponding one of a plurality of phase nodes based on a corresponding one of a plurality of pulse width modulation (PWM) signals to develop an output voltage at an output node;
    control logic that monitors said output voltage and a droop voltage for developing said plurality of PWM signals; and
    a droop circuit that provides said droop voltage, comprising:
       an amplifier having an inverting input, a non-inverting input and an output that develops said droop voltage relative to said output node;
       a plurality of first resistors, each coupled between a corresponding output inductor and said non-inverting input of said amplifier;
       a first capacitor coupled between said output node and said output of said amplifier;
       a second resistor coupled between said output node and said inverting input of said amplifier; and
       a third resistor coupled between said inverting input and said output of said amplifier.

12. The multiphase DC-DC converter of claim 11, wherein each of said plurality of first resistors is coupled to a corresponding phase node, further comprising a second capacitor coupled between said output node and said non-inverting input of said amplifier.

13. The multiphase DC-DC converter of claim 12, further comprising a fourth resistor coupled in parallel with said second capacitor.

14. The multiphase DC-DC converter of claim 12, further comprising a plurality of fourth resistors, each having a first end coupled to an output terminal of a corresponding one of said plurality of output inductors, and a second end forming an alternative output node coupled to said first and second capacitors and said second resistor instead of said output node.

15. The multiphase DC-DC converter of claim 11, further comprising:
    a plurality of current sense resistors, each coupled between a corresponding output inductor and said output node forming a plurality of current sense nodes each between a corresponding current sense resistor and a corresponding output inductor; and
    wherein each of said plurality of first resistors is coupled to a corresponding one of said plurality of current sense nodes.

16. The multiphase DC-DC converter of claim 15, further comprising a fourth resistor coupled between said output node and said non-inverting input of said amplifier.

17. The multiphase DC-DC converter of claim 15, further comprising a plurality of fourth resistors, each having a first end coupled to an output terminal of a corresponding one of said plurality of current sense resistors, and a second end forming an alternative output node coupled to said first capacitor and said second resistor instead of said output node.

18. The multiphase DC-DC converter of claim 11, wherein said amplifier comprises a low power amplifier.

19. The multiphase DC-DC converter of claim 11, wherein said amplifier exhibits relatively low di/dt and dv/dt responses.

20. The multiphase DC-DC converter of claim 11, wherein said amplifier comprises a transconductance amplifier with a high output impedance at high frequencies.

* * * * *